US006880492B2

United States Patent
Gottschalk et al.

(10) Patent No.: US 6,880,492 B2
(45) Date of Patent: Apr. 19, 2005

(54) DEVICE FOR INTRODUCING HOT GAS INTO A HEATING SURFACE PIPE OF A WASTE HEAT BOILER

(75) Inventors: Horst Gottschalk, Düsseldorf (DE); Michael Schötz, Leverkusen (DE)

(73) Assignee: ALSTOM Power Energy Recovery GmbH, Kassel-Battenhausen (DE)

( * ) Notice: Subject to any disclaimer, the term of this patent is extended or adjusted under 35 U.S.C. 154(b) by 6 days.

(21) Appl. No.: 10/486,173

(22) PCT Filed: Aug. 7, 2002

(86) PCT No.: PCT/DE02/02895
§ 371 (c)(1),
(2), (4) Date: Jul. 12, 2004

(87) PCT Pub. No.: WO03/016807
PCT Pub. Date: Feb. 27, 2003

(65) Prior Publication Data
US 2004/0244730 A1 Dec. 9, 2004

(30) Foreign Application Priority Data
Aug. 13, 2001 (DE) .......................................... 101 38 626

(51) Int. Cl.⁷ ................................................ F22B 37/36
(52) U.S. Cl. ..................................... 122/7 R; 122/494
(58) Field of Search ........................... 122/7 R, 235.13, 122/235.22, 494; 220/567.3, 495.01, 694.1

(56) References Cited

U.S. PATENT DOCUMENTS 2,916,021 A * 12/1959 Bastek ........................ 122/494
5,873,329 A * 2/1999 Heering et al. .............. 122/7 R

FOREIGN PATENT DOCUMENTS

DE 198 22 546 C1 6/1999

* cited by examiner

Primary Examiner—Gregory Wilson
(74) Attorney, Agent, or Firm—Alix, Yale & Ristas, LLP

(57) ABSTRACT

A device for introducing hot gas into a heating surface pipe of a waste heat boiler includes an outer pipe that is connected to the boiler wall, preferably to the bottom of the pipe. The device also includes an inner pipe or entry pipe that has an admission section that is cylindrical or conically narrows and also has a discharge section that is connected to the heating surface pipe. The inner pipe is connected to the outer pipe via a rounded reversible cap while forming an entry opening for the hot gas. The inner pipe is surrounded by the outer pipe at a distance. The device also includes a coolant guiding pipe, which is placed between the outer pipe and the inner pipe and which extends into the proximity of the reversible cap. The guiding pipe is provided in the form of a force-transmitting component and is connected, in a removable or fixed manner, both to the inner pipe as well as to the outer pipe each time with at least three connecting ribs which are uniformly distributed over the periphery and which are provided for introducing or transferring forces.

10 Claims, 3 Drawing Sheets

DEVICE FOR INTRODUCING HOT GAS INTO A HEATING SURFACE PIPE OF A WASTE HEAT BOILER

CROSS-REFERENCE TO RELATED APPLICATIONS

This is the national stage of International Application No. PCT/DE02/02895, filed Aug. 7, 2002 and which designated the United States.

BACKGROUND OF THE INVENTION

The invention relates to an apparatus for the entry of hot gas into a heating surface tube of a waste heat boiler having an outer tube connected to the boiler wall, in particular to the tube base, and further having inner or inlet tube that is connected to the outer tube by means of a rounded reversing cap to form an inlet port for the hot gas and that is surrounded by the outer tube at a given distance and that has a cylindrical or conically narrowing inflow section and an outflow section that is connected to the heating surface tube, and having a coolant transport tube that is disposed between the outer tube and the inner tube and that extends into the vicinity of the reversing cap.

In waste heat boilers or heat exchangers, hot gases (such as synthesis gases from partial oxidation systems) are cooled by coolants, in most cases generating steam. The heat exchangers preferably consist of a plurality of straight, curved or helical heating surface systems that are connected to each other in parallel and that are formed by a plurality of heating surface tubes.

The heat exchanger inlet areas that are exposed to the hot gas, in particular, are subjected to very high thermal loads. Because of the high system pressure of the heat-absorbing medium (such as boiling water), additional high mechanical loads result that, among other things, also must be removed by the inlet areas or the devices provided for the hot gas to enter the heating surface tubes.

The publication "Verfahrenstechnik: Anlagen-und Apparatebau, Komponenten und Teilkreisläufe" [process engineering: system and apparatus design, components and subcircuits] (1986), page 19, published by the firm of L. & C. Steinmüller, discloses an apparatus of the type defined in the preamble. In this prior-art apparatus, components are present-and this applies in particular to the reversing caps where the gas enters the apparatus—at which unacceptably high surface temperatures and/or unacceptably high mechanical and thermal loads can occur. In addition, these components can lead to a limiting of the gas-side flow rate of each individual device used for the entry of hot gas into a heating surface tube of a waste heat boiler, and, as a consequence, to the limiting of the gas-side flow rate in the downstream heating surface tube and, thus, in the entire waste heat boiler. High surface temperatures result in a wide range of risks with regard to various corrosion mechanisms.

SUMMARY OF THE INVENTION

The object of the present invention is to provide an apparatus for the entry of hot gas into a heating surface tube of a waste heat boiler that avoids the aforesaid disadvantages. In particular, an apparatus is to be created that permits:
  critical components to be designed to have the thinnest possible walls, taking corrosion mechanisms into account so that corrosion can be avoided,
  the number of heating surface tubes in a waste heat boiler or heat exchanger that are necessary and that are each supplied with hot gas from an inlet device to be minimized,
  and the forces applied to the components of the apparatus as a result of the extremely high coolant or water pressures (up to about 150 bar) to be handled safely and reliably.

Through the solution proposed in the invention, an apparatus for the entry of hot gas into the heating surface tube of a waste heat boiler is created that has the following advantages:

The transfer of forces caused by the coolant pressure or by thermal loads through the coolant transport tube allows the reversing cap area of the apparatus for the entry of hot gas into a heating surface tube of a waste heat boiler to be optimally designed from the standpoint of fluid dynamics on the hot gas side (as, for example, a trumpet-shaped flared area), without the need to design this area to be thicker or to reinforce this area. This reduces the corrosion risk on the component.
  Minimal wall thicknesses can be achieved in the reversing cap area, since the total level of mechanical and thermal loads is substantially lower in this location.
  The position of maximum thermal loads is disassociated from the position of maximum mechanical stresses, and by choosing the load transfer point specifically to be in the area of the inlet cone or cylinder of the apparatus for the entry of hot gas into a hot surface tube of a waste heat boiler, the position where the thermal loads are the lowest in the entire inlet area was selected.
  The reversing cap area is much easier to inspect and clean, since there are no additional components in the reversing area to impair the work.
  The reversing cap area can be replaced in a short time as a single piece using relatively simple tools.
  The area of the reversing cap that is under maximum load with regard to the application of thermal and mechanical loads is uncoupled.
  The positioning of the coolant transfer plate of the apparatus for the entry of hot gas into a heating surface tube of a waste heat boiler is readily apparent at all times, since it is designed to be mechanically stable and since its position cannot be changed.
  It is easier to clean possible contamination from the reversing cap on the water side.
  The gas flow rate through an apparatus of the invention for the entry of hot gas into a heating surface tube of a waste heat boiler can exhibit significantly higher mass flow rates compared with an unsupported apparatus for the entry of hot gas into a heating surface tube of a waste heat boiler (the flow is greater by a factor of about 2 to 4), and in design terms there are additional possibilities for enlarging the inlet geometry.

The longitudinal axes of the connecting ribs are oriented in an advantageous manner, in each case parallel to the apparatus longitudinal axis, and the connecting ribs are oriented radially. In this way, the forces that are to be transferred can be transferred effectively and the coolant flow resistances are thereby minimized.

In a preferred embodiment of the invention, the length (L) of the connecting rib includes at least a portion of the length of the transport tube or of the apparatus. Through this measure, the length of the connecting ribs can be fully matched to the design requirements and to the forces that must be transferred.

Since the forces applied to the apparatus mainly act upon the gas inlet area, in a preferred embodiment of the invention, the connecting ribs are located in the area of the conical or cylindrical inlet section. As a result of this measure, the forces are absorbed directly at the location at which they are applied.

In order to minimize or prevent the formation of eddies when the coolant passes through the area of the apparatus, the coolant is made to pass by the connecting ribs inside of the annular cross section, and also to minimize the resulting pressure losses, the connecting ribs or their inflow or outflow exposure surfaces are preferably configured in a manner that is favorable to flow in the direction in which the coolant travels.

In order to transfer the applied forces optimally into the transport tube or to transfer them away from the transport tube with an apparatus having a fixed or non-fixed connection between the outer tube or the inner tube and the transport tube, the connecting ribs between the inner tube and the transport tube are advantageously disposed upstream or downstream from the connecting ribs between the outer tube and the transport tube seen in the direction in which the hot gas travels.

In order to achieve an optimal design of the apparatus, moreover, the connecting ribs between the outer tube and the transport tube are disposed at an angular displacement relative to the connecting ribs between the inner tube and the transport tube on the cross-section side.

In order that a narrowing of the cross sectional area that could result in pressure losses in the cooling medium does not occur at the annular flow cross sections between the outer tube and the transport tube or the transport tube and the inner tube in the area of the connecting ribs in a preferred embodiment of the invention, the cross section in the area of the connecting ribs can be extended radially, so that it basically corresponds to the cross-sectional area upstream or downstream from the connecting ribs.

The non-fixed connection between the outer or inner tube and the transport tube is advantageously designed in such a way that the transport tube is equipped with grooves on its outer and inner circumference in order to accept the respective connecting ribs of the inner or of the outer tube. In this way, a connection is established that is clearly defined and whose establishment and installation is thereby simplified. In a preferred embodiment, the connecting ribs are positioned so that they are free to slide in the radial direction inside the grooves.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

Figure 1:
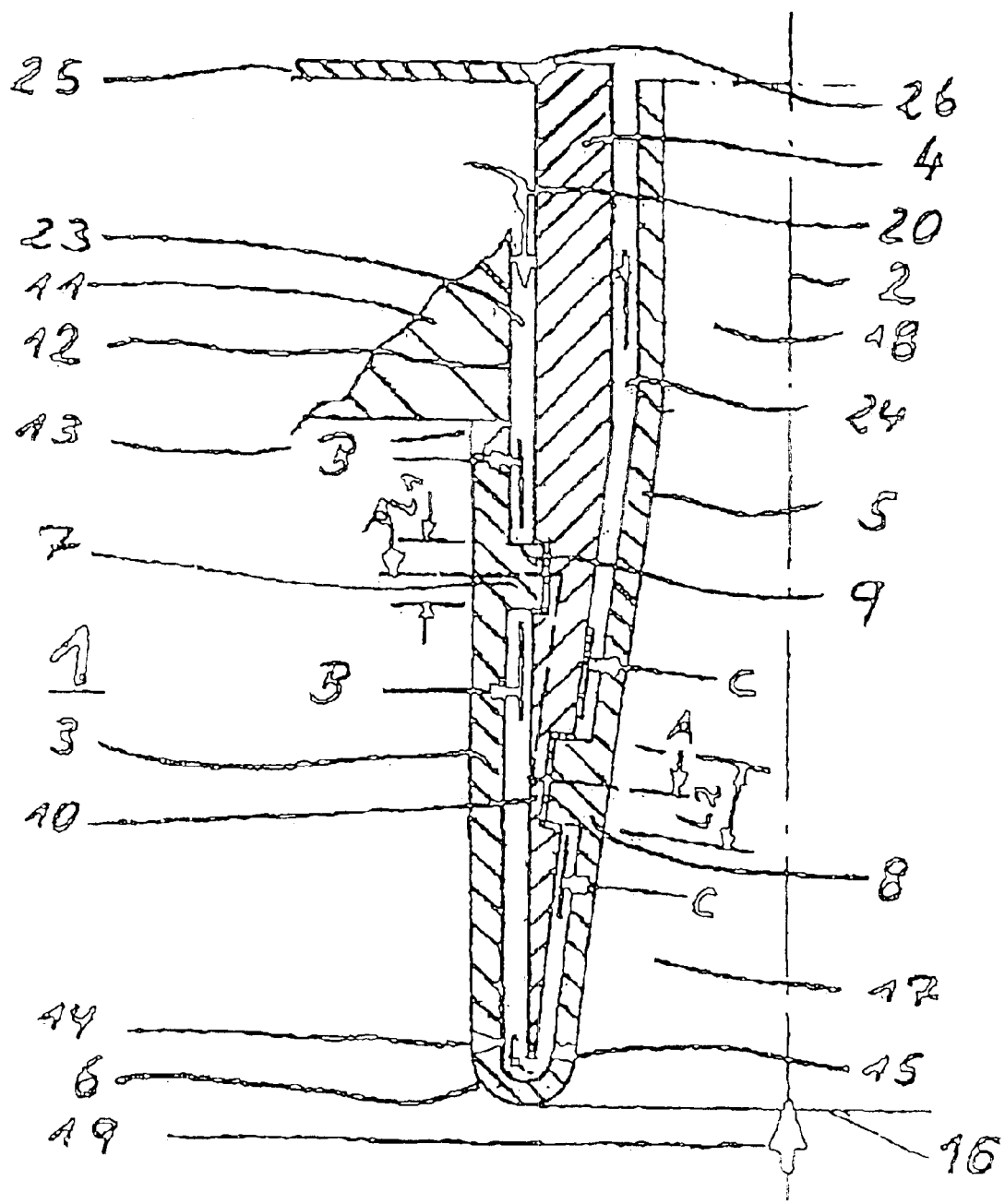
FIG. 1 is a vertical cross-section through a first embodiment of the apparatus of the invention.

In FIG. 1 of the waste heat boiler that is represented here, only a part of the vessel wall, namely the tube base 11 is shown. This part is connected in the area of hole 12 to an apparatus 1 for the entry of the hot gas 19 into a heating surface tube of the waste heat boiler (not shown) by means of a weld 13. An outer tube 3 and inner or inlet tube 5 that is surrounded by the outer tube 3 are part of the apparatus 1 and are connected to each other by means of a rounded reversing cap 6. In the embodiment shown in FIG. 1, the reversing cap-which causes the coolant 20 to reverse the direction of flow within the apparatus 1, essentially by 180°, is configured as a part that is located in the reversing area of the apparatus 1 and that is connected to the outer tube 3 by means of a weld 14 and to the inner tube 5 by means of a weld 15. The reversing cap 6 defines a gas inlet port 16 from which gas enters the inner or inlet tube 5. The inner tube 5 has a conically narrowing section 17 at the inlet, and this section makes a transition to the straight cylindrical outflow section 18 that is connected to the heating surface tube and through which the hot gas 19 flows. Unlike the drawing in FIG. 1, the conically narrowing section 17 may also be cylindrical. The spatial extension of the apparatus 1 for the entry of hot gas into a heating surface tube of a waste heat boiler in which the longitudinal direction 2 must still be defined by extending it on the gas side upstream in the heating surface tube, not shown.

A coolant transport tube 4 is located between the outer tube 3 and the inner tube 5, and its one end is connected as shown in this embodiment by means of a connection 26, which may be a weld, as shown in FIG. 1, and that is connected to the intermediate tube plate 25 that is connected to the container wall of the waste heat boiler, and whose free end terminates in the reversing area of the reversing cap 6. The transport tube 4 is designed in such a way that it can withstand the forces or loads that are created within apparatus 1 by the high pressure of the coolant 20, by thermal stresses, as well as the gas pressure of the hot gas 19, taken up by the inner tube, and transfers them to the outer tube 3, from which location the forces are transferred into the tube base 11, in other words the vessel wall of the waste heat boiler. In order to transfer these forces, the inner tube 5 as well as the outer tube 3 with its connecting ribs or cams 7, 8 is connected to the transport tube 4, either in a fixed or non-fixed manner, whereby in the case of the fixed connection, the apparatus 1 may be welded, milled, or cast. The transfer of forces through the transport tube 4 preferably occurs in the area of the conical inlet section 17 of the apparatus 1 (as shown in FIG. 1) or in the cylindrical section (alternative configuration), and the conical or cylindrical inlet section 17 extends in an axial direction over 10 to 80% of the total length of the apparatus 1. With a fixed connection, as well as a non-fixed connection, between the transport tube 4 and the outer tube 3 or the inner tube 5, the connecting rib 8 between the transport tube 4 and the inner tube 5 is preferably disposed in a position that is offset relative to the connecting rib 7 between the transport tube 4 and the outer tube 3 in order to achieve an optimized transfer of force from the inner tube 5 to the outer tube 3.

Figure 2:
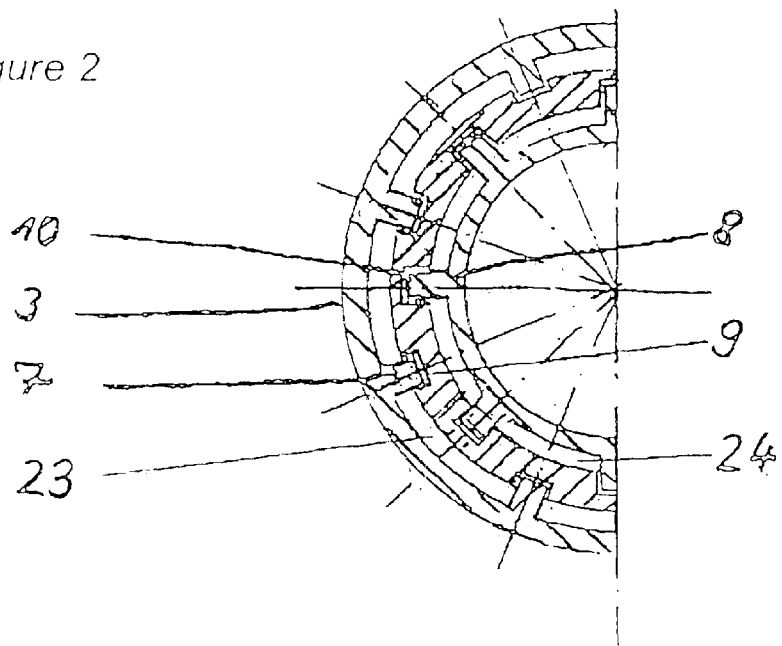
FIG. 2 is a horizontal cross section taken along line A—A of FIG. 1.

FIG. 2 shows an apparatus 1 of the invention in which the transport tube is connected via connection ribs 7, 8 in a non-fixed manner with the inner tube 5 and the outer tube 3, respectively. The inner tube 5 is configured on its outer circumference with a plurality of connecting ribs 8 that are uniformly distributed about the circumference and are radially oriented, and whose longitudinal axes 28 are in each case aligned parallel to the apparatus longitudinal axis 2. The connecting ribs 8, which have a length L2, extend at least across a portion of the length of the transport tube 4 or the apparatus 1. The projecting connecting ribs 8 are received by grooves 10 disposed on the inner circumference of the transport tube 4 with which the transport tube 4 is configured and which are located precisely opposite to the connection ribs 8. The grooves 10 are designed in such a way that the connecting ribs 8 of the inner tube 5 have freedom of movement within the grooves 10 in a radial direction, however they are restrained in an axial and in an angular direction, in other words, there is a sliding connection in the radial direction of the inner tube 5 and the outer tube 3. In terms of its location and construction, the connection between the outer tube 3 and the transport tube 4 is the same as the connection between the transport tube and the inner tube 5, although in this case the connecting ribs 7 are disposed on the inner circumference of the outer tube 3 and radially extend inward into the grooves 9 disposed on the outer circumference of the transport tube 4. Once again, there is freedom of movement here in the radial direction, while in the axial and angular directions the ribs 7 are restrained and have a length L1, which extends at least over a portion of the length of the transport tube 4 or of the apparatus 1. The lengths L1 and L2 of the ribs 7, 8 therefore can extend over the full length of the transport tube 4 or the apparatus 1. Seen across the cross section of the apparatus 1, the connecting ribs 7 are configured in an angularly offset position relative to the connecting ribs 8, in order to achieve an optimal design.

Figure 3:
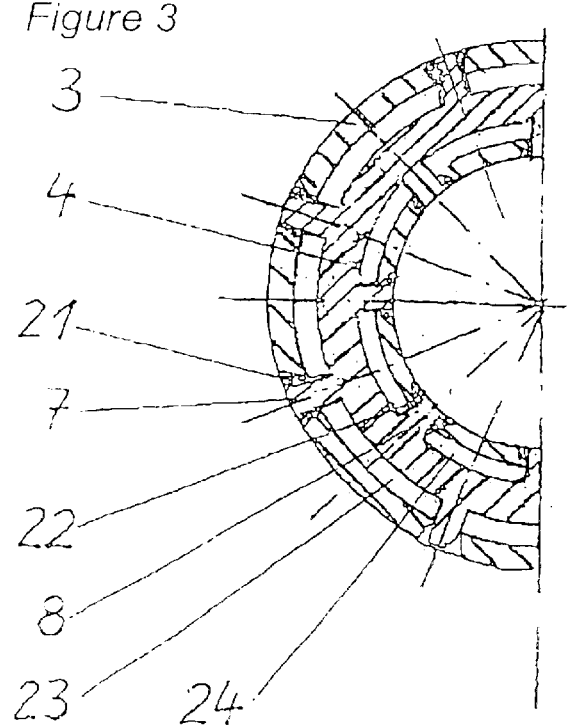
FIG. 3 is a horizontal cross section of a second embodiment of the subject invention.
Figure 4:
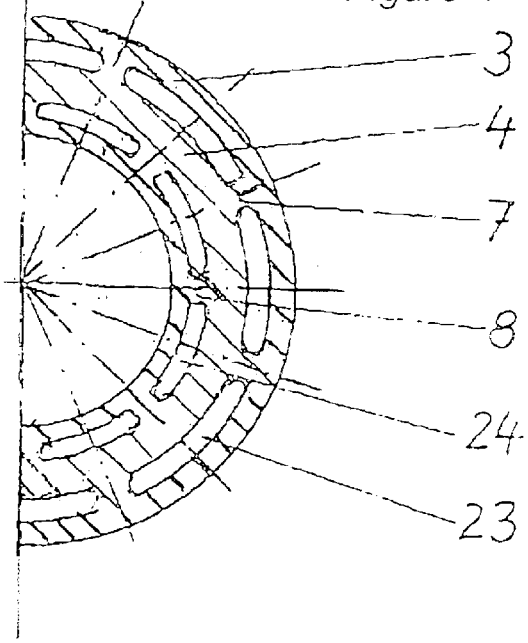
FIG. 4 is a horizontal cross section of a third embodiment of the subject invention.
Figure 5:
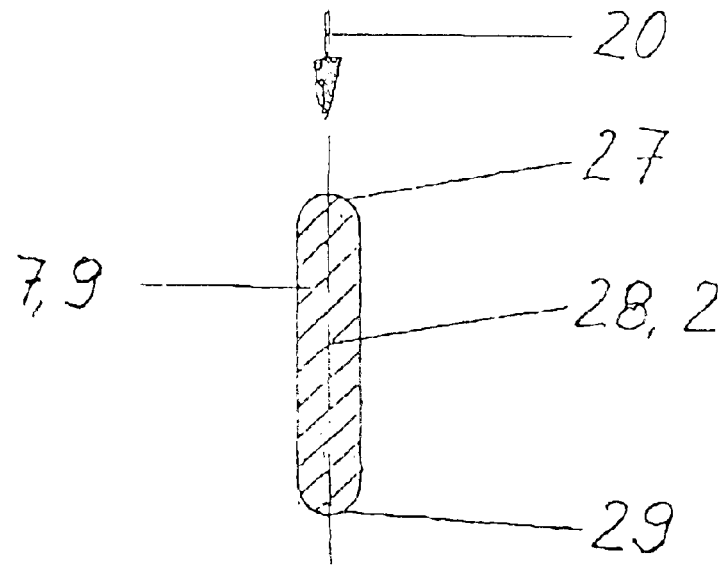
FIG. 5 is a longitudinal section through a connecting rib between the outer tube and the transport tube, taken along line B—B of FIG. 1.
Figure 6:
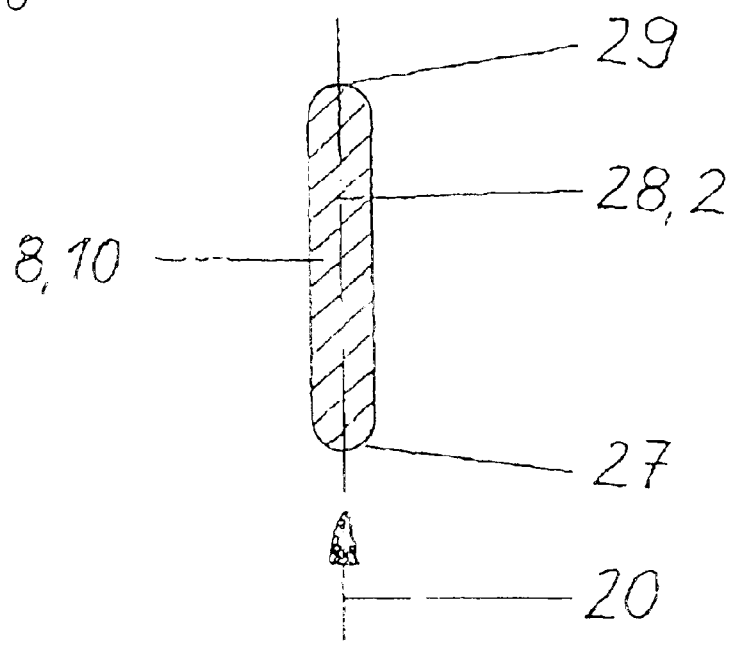
FIG. 6 is a longitudinal section through a connecting rib between the inner tube and the transport tube, taken along line C—C of FIG. 1.

FIGS. 3 and 4 show the apparatus of the invention with a transport tube 4 that is connected to the inner tube 5 as well as to the outer tube 3. While FIG. 3 shows a welded design and the connecting ribs 7, 8, each of which is located on the transport tube 4, are welded to the outer tube 3 as well as to the inner tube 5, FIG. 4 shows a cast design. As in the non-fixed connection, in the welded design the transport tube 4 has a plurality of connecting ribs 7, 8 on its outer circumference and on its inner circumference. The longitudinal axes 28 of these ribs are each parallel to the apparatus longitudinal axis 2 and they extend at least over a portion of the length over the transport tube 4 or of the apparatus 1, are radially oriented, and are uniformly distributed about the circumference. The connecting ribs 7, 8 are inserted into the openings 21, 22 located in the outer and inner tubes, 3, 5, respectively, and they are welded to the tubes, 3, 5.

The connection tubes 7, 8 or their inflow exposure surfaces 27 and outflow exposure surfaces 29 are designed in a manner that is favorable to flow, both when there is a fixed and non-fixed connection between the transport tube 4 and the inner or outer tubes 3, 5 seen in the direction in which the cooling medium 20 flows (see direction indicated by arrow in FIG. 1), so that the connecting ribs 7, 8 which lie in the annular cross section of flow 23, 24 only cause small losses of flow.

In order to avoid flow cross section constrictions and, as a result, losses in pressure in the area of the connecting ribs 7, the annular cross section 23 (between the outer tube 3 and the transport tube 4) can be configured to be essentially just as large in the area of the connecting ribs 7 as the annular cross section 23 upstream or downstream from the connecting ribs 7. To accomplish this, the depth of the cross section 23 in the area of the ribs 7 is enlarged in terms of its area by an amount equal to the total area taken up by the existing ribs 7. The same procedure can be used for the annular cross section 24 (between the inner tube 5 and the transport tube 4) in the area of the connecting ribs 8.

In contrast to the drawing shown in FIG. 1, the gas inlet port 16 can also be flared in a torus or trumpet shape in order to increase the efficiency with which the gas enters the apparatus 1.

As a result of the design of the apparatus in accordance with the invention, minimal wall thicknesses can be used in the area of the inner and outer tubes, 3, 5, as well as the reversing cap 6. This also minimizes the risk of corrosion on these components. The design of the invention also allows larger inlet geometries to be created in the apparatus 1, compared with a prior-art apparatus. Since the heating surface tubes that are downstream from the apparatus 1 can also be designed to be larger, this advantageously results in the ability to have larger gas mass flow rates in the boiler unit.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An apparatus for introducing hot gas into a heating surface tube of a waste heat boiler having a boiler wall, the apparatus comprising:

an outer tube connected to the boiler wall, the outer tube having inlet and outlet ends and defining a longitudinal axis of the apparatus;

an inner tube disposed within the outer tube, the inner tube having a narrowing inflow section and an outflow section, the inflow section being adapted for receiving the hot gas;

a rounded, reversing cap connecting the outflow section of the inner tube to the inlet end of the outer tube;

a coolant transport tube disposed between the outer tube and the inner tube and extending toward the reversing cap; and a plurality of connecting ribs connecting the coolant transport tube to the outer tube and the inner tube, the connecting ribs being spaced about a circumference of the coolant transport tube.

2. The apparatus of claim 1, wherein the connecting ribs are oriented radially and each of the connecting ribs has a longitudinal axis that is substantially parallel to the apparatus longitudinal axis.

3. The apparatus of claim 1, wherein the transport tube and each of the connecting ribs have a longitudinal length, the length of each connecting rib being equal to a portion of the length of the transport tube.

4. The apparatus of claim 1, wherein the connecting ribs are disposed in the area of the inflow section.

5. The apparatus of claim 1, wherein each of the connecting ribs has at least one surface exposed to flow, said surface being designed to be favorable to said flow.

6. The apparatus of claim 1, wherein the connecting ribs connecting the outer tube to the transport tube are longitudinally displaced from the connecting ribs connecting the inner tube to the transport tube.

7. The apparatus of claim 1, wherein the connecting ribs connecting the outer tube to the transport tube are angularly offset from the connecting ribs connecting the inner tube to the transport tube.

8. The apparatus of claim 1, wherein the inner and outer tubes each define an annular flow path with the transport tube, the cross-sectional area of each annular flow path proximate to the connecting ribs being substantially equal to the cross-sectional area of each annular flow path upstream or downstream from the respective connecting ribs.

9. The apparatus of claim 1, wherein the inner tube includes a plurality of the connecting ribs extending from an outer surface of the inner tube, the outer tube includes a plurality of the connecting ribs extending from an inner surface of the outer tube, and the transport tube has outer and inner surfaces, each defining a plurality of grooves, the grooves of the transport tube inner and outer surfaces receiving the ribs of the inner and outer tubes, respectively, whereby the connecting ribs provide a non-fixed connection between the outer tube or inner tube and the transport tube.

10. The apparatus of claim 9, wherein the connecting ribs are movable within the grooves in a radial direction.

* * * * *